United States Patent
Ahn

(10) Patent No.: US 9,500,134 B2
(45) Date of Patent: Nov. 22, 2016

(54) GAS TURBINE SYSTEM HAVING PLURALITY OF FLOW METERS TO METER AIR AND FUEL AMOUNT TO CONTROL WOBBE INDEX RANGE

(71) Applicant: HANWHA TECHWIN CO., LTD., Changwon-si (KR)

(72) Inventor: Chul-Ju Ahn, Changwon (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 775 days.

(21) Appl. No.: 13/868,190

(22) Filed: Apr. 23, 2013

(65) Prior Publication Data

US 2013/0305735 A1    Nov. 21, 2013

(30) Foreign Application Priority Data

May 18, 2012   (KR) .................. 10-2012-0053153

(51) Int. Cl.
| | | |
|---|---|---|
| *F02C 9/26* | (2006.01) | |
| *F23R 3/28* | (2006.01) | |
| *F02C 9/28* | (2006.01) | |

(52) U.S. Cl.
CPC ............ *F02C 9/26* (2013.01); *F02C 9/263* (2013.01); *F02C 9/28* (2013.01); *F23R 3/28* (2013.01); *F23R 3/286* (2013.01)

(58) Field of Classification Search
CPC ........... F02C 9/26; F02C 9/263; F02C 9/16; F02C 9/20; F02C 9/28; F23R 3/286; F23R 3/28

USPC ............... 60/776, 773, 734, 737, 736
See application file for complete search history.

(56) References Cited

U.S. PATENT DOCUMENTS

| | | | |
|---|---|---|---|
| 6,082,092 A * | 7/2000 | Vandervort | F02C 9/28 60/39.281 |
| 6,502,402 B1 | 1/2003 | Smith et al. | |
| 7,895,821 B2 | 3/2011 | Annigeri et al. | |
| 7,989,082 B2 | 8/2011 | Vanrheenen | |
| 2006/0021354 A1 | 2/2006 | Mowill | |
| 2007/0089426 A1 * | 4/2007 | Vandale | F23D 14/62 60/776 |
| 2008/0289339 A1 * | 11/2008 | Asti | F02C 7/224 60/734 |
| 2010/0275609 A1 | 11/2010 | Snider | |
| 2010/0319353 A1 * | 12/2010 | Intile | F23R 3/36 60/772 |
| 2011/0296844 A1 | 12/2011 | Widener et al. | |
| 2012/0036863 A1 * | 2/2012 | Kirzhner | F02C 7/22 60/776 |

FOREIGN PATENT DOCUMENTS

JP          6323166 A       11/1994

* cited by examiner

*Primary Examiner* — Steven Sutherland
(74) *Attorney, Agent, or Firm* — Sughrue Mion, PLLC

(57) ABSTRACT

Provided is a gas turbine including: a first compressor which compresses air; a mixer which adds the compressed air from the first compressor to fuel and generates a fuel mixture; a combustor which combusts the generated fuel mixture from the mixer; a plurality of flow meters which adjusts an amount of the air or the fuel injected into the mixer; and a control unit which maintains the Wobbe Index of the fuel mixture within a predetermined Wobbe Index range.

19 Claims, 5 Drawing Sheets

GAS TURBINE SYSTEM HAVING PLURALITY OF FLOW METERS TO METER AIR AND FUEL AMOUNT TO CONTROL WOBBE INDEX RANGE

CROSS-REFERENCE TO RELATED PATENT APPLICATION

This application claims the priority from Korean Patent Application No. 10-2012-0053153, filed on May 18, 2012, in the Korean Intellectual Property Office, the disclosure of which is incorporated herein by reference in its entirety.

BACKGROUND

1. Field

Apparatuses and methods consistent with exemplary embodiments relate to a gas turbine system, and more particularly to, a gas turbine system that adjusts the Wobbe Index (WI) of a fuel mixture and operates with the adjusted fuel mixture.

2. Description of the Related Art

Performance of an apparatus for generating power using fuel is very important. Factors for determining such performance are diverse. In particular, the Wobbe Index (WI) among the factors for determining the performance may be used to size a fuel system. The WI is an index indicating size of heat input energy with respect to a combustor according to a fuel component and may be expressed as a function of a heating value and specific gravity. In particular, the WI is used as an indicator of the interchangeability of fuel gases in a fuel system and may have variations of up to 5%.

The WI may be defined as Equation 1 below, $$WI = \frac{LHV}{\sqrt{(Sp.Gr)}} \quad \text{[Equation 1]}$$

wherein LHV denotes a lower heating value in Kcal/Nm$^3$, and Sp.Gr denotes a specific gravity of gas at 0° C. and 1 atm.

The WI may be modified and the modified Wobbe Index (MWI) may be defined as Equation 2 below, $$MWI = \frac{LHV}{\sqrt{(Sp.Tg)}} \quad \text{[Equation 2]}$$

wherein LHV denotes the lower heating value in Kcal/Nm$^3$, and Sp.Tg denotes an absolute temperature of gas at 1 atm.

The WI or the MWI is an important issue in designing the fuel system as described above. For example, if a change in a value of the WI or the MWI is great, since the fuel system needs to be changed as a whole, the entire fuel system is newly designed or manufactured. Thus, if it is possible to control the WI according to the fuel component, an existing fuel system may be utilized without newly designing or manufacturing the entire fuel system.

Meanwhile, methods of controlling the WI or the MWI may be diverse. For example, as a prior art publication relating to controlling an amount of air supplied to a combustor, Japanese Patent Application Publication No. 1994-323166 discloses separately controlling a flux of fuel supplied to a fuel nozzle to obtain an optimal air-to-fuel ratio.

SUMMARY

One or more exemplary embodiments provide a gas turbine system that controls a Wobbe Index of a fuel mixture and supplies the fuel mixture, thereby reducing an ejection of a contamination material.

According to an aspect of an exemplary embodiment, there is provided gas turbine including: a first compressor which compresses air; a mixer which adds the compressed air from the first compressor to fuel and generates a fuel mixture; a combustor which combusts the generated fuel mixture from the mixer; a plurality of flow meters which adjust an amount of the air or the fuel injected into the mixer; and a control unit which maintains the Wobbe Index of the fuel mixture within a predetermined Wobbe Index range.

The first compressor compresses the air supplied from an external source.

The gas turbine may further include a second compressor which compresses the air supplied from an external source, and supplies the compressed air from the second compressor to at least one of the combustor and the first compressor.

The plurality of flow meters may include a fuel flow meter which adjusts an amount of the fuel supplied to the mixer.

The gas turbine may further include a first sensor unit which measures at least one of temperature, pressure, and flux of fuel ejected from the fuel flow meter.

The gas turbine may further include a heat exchanger which heats at least one of the air ejected from the first compressor and the fuel supplied to the mixer.

The gas turbine may further include a turbine which operates by a combustion gas ejected from the combustor, wherein the heat exchanger thermally exchanges heat between the ejected combustion gas and at least one of the air and fuel.

The gas turbine may further include a second sensor unit which measures at least one of a temperature and a pressure of the fuel injected into the heat exchanger and the fuel ejected from the heat exchanger.

The gas turbine may further include a third sensor unit which measures at least one of a temperature, a pressure, and a flux of the air ejected from the mixture air flow meter.

The gas turbine may further include a fourth sensor unit disposed between the mixer and the combustor which measures a mixing ratio, a temperature, and a pressure of the fuel mixture supplied from the mixer to the combustor.

The control unit calculates the Wobbe Index based on the mixing ratio, temperature, and pressure of the fuel mixture measured by the fourth sensor unit, compares the calculated Wobbe Index with the predetermined Wobbe Index range, and controls the plurality of flow meters to adjust an amount of the air or fuel injected into the mixer.

The control unit calculates the Wobbe Index based on mixing ratio, temperature, and pressure of the generated fuel mixture from the mixer.

The control unit controls the temperature and the pressure of the generated fuel mixture to decrease or controls a proportion of fuel of the generated fuel mixture to increase if the calculated Wobbe Index is smaller than a minimum value of the predetermined Wobbe Index range.

The control unit controls the gas turbine to maintain an operating status if the calculated Wobbe Index is within the predetermined Wobbe Index range.

The control unit controls the temperature and the pressure of the generated fuel mixture to increase or controls a proportion of fuel of the generated fuel mixture to decrease if the calculated Wobbe Index is larger than a maximum value of the predetermined Wobbe Index range.

The gas turbine may further include a plurality of heat exchangers which perform heat change of the compressed air and the fuel, wherein the control unit calculates the Wobbe Index based on mixing ratio, temperature, and pressure of the generated fuel mixture from the mixer, and wherein the controller controls at least one of the plurality of flow meters and the plurality of heat exchangers to maintain the calculated Wobbe Index within the predetermined Wobbe Index range.

According to an aspect of another exemplary embodiment, there is provided method of operating a gas turbine, the method including: providing air from a source; compressing the air; adding the compressed air to fuel; generating a fuel mixture; combusting the generated fuel mixture; adjusting an amount of the compressed air or the fuel by a plurality of flow meters; and maintaining the Wobbe Index of the fuel mixture within a predetermined Wobbe Index range.

The method may further include: calculating the Wobbe Index based on mixing ratio, temperature, and pressure of the generated fuel mixture, and controlling at least one of the plurality of flow meters and a plurality of heat exchangers to maintain the calculated Wobbe Index within the predetermined Wobbe Index range.

The controlling of the at least one of the plurality of flow meters and the plurality of heat exchangers may include: controlling the temperature and the pressure of the generated fuel mixture to decrease or controlling a proportion of fuel of the generated fuel mixture to increase if the calculated Wobbe Index is smaller than a minimum value of the predetermined Wobbe Index range; controlling a gas turbine to maintain an operating status if the calculated Wobbe Index is within the predetermined Wobbe Index range; and controlling the temperature and the pressure of the generated fuel mixture to increase or controlling a proportion of fuel of the generated fuel mixture to decrease if the calculated Wobbe Index is larger than a maximum value of the predetermined Wobbe Index range.

BRIEF DESCRIPTION OF THE DRAWINGS

The above and/or other features and advantages will become more apparent by describing in detail exemplary embodiments thereof with reference to the attached drawings in which.

DETAILED DESCRIPTION

Hereinafter, exemplary embodiments will be described more fully with reference to the accompanying drawings. The inventive concept may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Unless defined otherwise, technical and scientific terms used herein have the same meaning as is commonly understood by one of skill in the art to which this invention belongs. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added. Terms such as first, second, etc. may be used to describe various elements, but these terms do not limit elements and are used only to classify one element from another.

Figure 1:
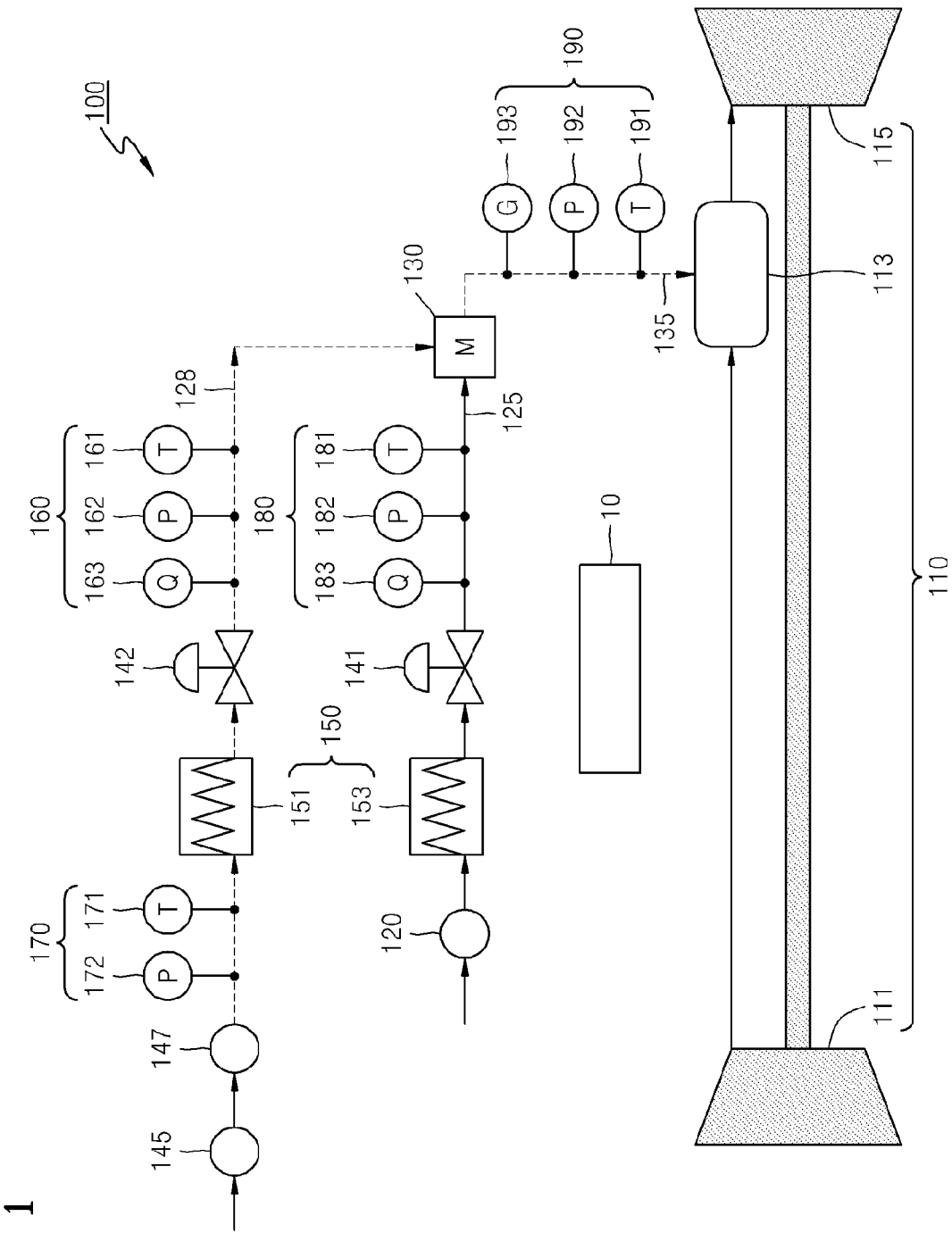
FIG. 1 is a conceptual diagram of a gas turbine system according to an exemplary embodiment.

FIG. 1 is a conceptual diagram of a gas turbine system 100 according to an exemplary embodiment.

Referring to FIG. 1, the gas turbine system 100 may include a gas turbine 110. The gas turbine 110 may include a second compressor 111 which compresses air injected from an external source. Here, the external source may include the outside. Also, the gas turbine 110 may further include a combustor 113 that is connected to the second compressor 111 which mixes a fuel mixture and the air supplied by the second compressor 111 and combusts the mixture. The gas turbine 110 may include a turbine 115 that operates by a combustion gas generated by combusting the fuel mixture in the combustor 113.

The second compressor 111, the turbine 115, and the combustor 113 may be integrally or separately formed. The second compressor 111, the turbine 115, and the combustor 113 may be formed in the same way as or in a similar way to the gas turbine 110, and thus detailed descriptions thereof are omitted here. For convenience of description, a case where the second compressor 111, the turbine 115, and the combustor 113 are integrally formed will now be described.

The gas turbine system 100 may include a first compressor 120 that compresses air. The first compressor 120 may intake and compress air from the outside or other external sources. Alternatively, the first compressor 120 may be connected to the second compressor 111 and may intake and compress the air supplied by the second compressor 111. However, for convenience of description, a case where the first compressor 120 intakes and compresses air from the outside will now be described. The first compressor 120 may be connected to a mixer 130 that will be described later through an air supply flow path 125 and supply the compressed air from the first compressor 120 to the mixer 130.

The gas turbine system 100 may include the mixer 130 connected to the first compressor 120. The mixer 130 may be connected to a fuel supply flow path 128 that receives fuel from an external fuel source (not shown). In particular, the mixer 130 may mix the fuel supplied by the fuel supply flow path 128 and the air supplied by the air supply flow path 125 to generate the fuel mixture. The mixer 130 may also be connected to the combustor 113. The mixer 130 may generate the fuel mixture and supply the fuel mixture to the combustor 113.

Meanwhile, the gas turbine system 100 may include a mixture air flow meter 141 that adjusts an amount of air injected into the mixer 130 in such a way that the fuel mixture may have the Wobbe Index within a predetermined range.

The mixture air flow meter 141 may be disposed on the air supply flow path 125 and may control an amount of air that flows through the air supply flow path 125.

The mixture air flow meter 141 may be configured in various ways. For example, the mixture air flow meter 141 may include a solenoid valve. The mixture air flow meter 141 may also include an apparatus that is rotatably installed in the air supply flow path 125 and adjusts an opening degree of the air supply flow path 125. However, configurations of the mixture air flow meter 141 is not limited thereto and may include any apparatus capable of adjusting the amount of air flowing through the air supply flow path 125.

The gas turbine system 100 may include a fuel flow meter 142 that adjusts an amount of fuel supplied to the mixer 130. The fuel flow meter 142 may be configured in various ways. For example, the fuel flow meter 142 may be formed as a valve. In particular, the fuel flow meter 142 may be configured as a solenoid valve that adjusts an opening degree of the fuel supply flow path 128.

However, the fuel flow meter 142 is not limited thereto and may include any apparatus capable of adjusting the opening degree of the fuel supply flow path 128 and adjusting an amount of fuel that flows through the fuel supply flow path 128. However, for convenience of description, a case where a solenoid valve is used as a fuel flow meter 142 will now be described.

The gas turbine system 100 may include a heat exchanger 150 disposed in at least one of the fuel supply flow path 128 and the air supply flow path 125. The heat exchanger 150 may include a first heat exchanger 151 disposed in the fuel supply flow path 128 and a second heat exchanger 153 disposed in the air supply flow path 125.

The first heat exchanger 151 may preheat fuel that flows through the fuel supply flow path 128. The second heat exchanger 153 may preheat air that flows through the air supply flow path 125. The first heat exchanger 151 may receive heat from an external heat source and preheat the fuel through a heat exchange with the fuel. The second heat exchanger 153 may receive heat from the external heat source and preheat the air through a heat exchange with the air.

The first heat exchanger 151 and the second heat exchanger 153 may be connected to the turbine 115 and use an exhaust gas discharged from the turbine 115 as a heat source of the thermal exchange in a case where the first heat exchanger 151 and the second heat exchanger 153 are connected to external heat sources.

In more detail, the first heat exchanger 151 may thermally exchange heat between the fuel and the exhaust gas discharged from the turbine 115. The second heat exchanger 153 may thermally exchange heat between the air and the exhaust gas discharged from the turbine 115.

For convenience of description, a case where the first heat exchanger 151 and the second heat exchanger 153 receive heat necessary for the heat exchange from external heat sources will now be described.

The first heat exchanger 151 and the fuel flow meter 142 may be disposed in various ways. For example, the first heat exchanger 151 may be disposed at an upstream side from the fuel flow meter 142 on the fuel supply flow path 128. Also, the first heat exchanger 151 may be disposed at a downstream side from the fuel flow meter 142 on the fuel supply flow path 128.

The second heat exchanger 153 and the mixture air flow meter 141 may be disposed in various ways. For example, the second heat exchanger 153 may be disposed at an upstream side the mixture air flow meter 141 on the air supply flow path 125. Also, the second heat exchanger 153 may be disposed at a downstream side from the mixture air flow meter 141 on the air supply flow path 125.

For convenience of description, a case where the first heat exchanger 151 is disposed at an upstream side of the fuel flow meter 142 and the second heat exchanger 153 is disposed at an upstream side of the mixture air flow meter 141 as shown in FIG. 1.

The gas turbine system 100 may include a first sensor unit 160 that measures at least one of a temperature, a pressure, and a flux of the fuel ejected from the fuel flow meter 142. The first sensor unit 160 may include a first temperature sensor unit 161 that measures the temperature of the fuel ejected from the fuel flow meter 142, a first pressure sensor unit 162 that measures the pressure of the fuel, and the first flux sensor unit 163 that measures the flux of the fuel.

The gas turbine system 100 may include a second sensor unit 170 that measures at least one of a temperature and a pressure of fuel injected into or fuel ejected from the heat exchanger 150. In particular, the second sensor unit 170 may be disposed on the fuel supply flow path 128 and measure at least one of a temperature and a pressure of fuel injected into or fuel ejected from the first heat exchanger 151.

The second sensor unit 170 may be disposed in various locations according to a location of the fuel flow meter 142. For example, in a case where the first heat exchanger 151 is disposed on the fuel supply flow path 128 at an upstream side of the fuel flow meter 142, the second sensor unit 170 may be disposed on the fuel supply flow path 128 at an upstream side of the first heat exchanger 151. The second sensor unit 170 may measure at least one of the temperature and pressure of the fuel injected into the first heat exchanger 150.

Meanwhile, in a case where the first heat exchanger 151 is disposed on the fuel supply flow path 128 at a downstream side of the fuel flow meter 142, the second sensor unit 170 may be disposed on the fuel supply flow path 128 at a downstream side of the first heat exchanger 151. The second sensor unit 170 may measure at least one of the temperature and pressure of the fuel ejected from the first heat exchanger 150.

However, for convenience of description, a case where the first heat exchanger 151 is disposed at an upstream side of the fuel flow meter 142 and the second sensor unit 170 is disposed at an upstream side of the first heat exchanger 151 will now be described.

The second sensor unit 170 may include a second temperature sensor unit 171 that measures the temperature of the fuel injected into the first heat exchanger 151 and a second pressure sensor unit 172 that measures the pressure of the fuel injected into the first heat exchanger 151.

The second temperature sensor unit 171 and the second pressure sensor unit 172 are disposed on the fuel supply flow path 128. The second temperature sensor unit 171 may be disposed at an upstream side or at a downstream side of the second pressure unit 172 on the fuel supply flow path 128.

The gas turbine system 100 may include a third sensor unit 180 that measures at least one of a temperature, a pressure, and a flux of air ejected from the mixture air flow meter 141. The third sensor unit 180 may include a third temperature sensor unit 181 that measures the temperature of air ejected from the mixture air flow meter 141 and a third pressure sensor unit 182 that measures the pressure of air ejected from the mixture air flow meter 141. The third sensor unit 180 may include a third flux sensor unit 183 that measures the flux of air ejected from the mixture air flow meter 141.

The third temperature sensor unit 181, the third pressure sensor unit 182, and the third flux sensor unit 183 may be disposed on the air supply flow path 125 and their order may be set in various ways.

The gas turbine system 100 may include a fourth sensor unit 190 that is disposed between the mixer 130 and the combustor 113 and measures a mixing ratio, a temperature, and a pressure of the fuel mixture supplied from the mixer 130 to the combustor 113. The mixing ratio of the fuel mixture means a mixing ratio of fuel and air. In more detail, the mixing ratio of the fuel mixture may calculate the mixing ratio of fuel and air in terms of percent (%) concentration, mole concentration, and molal concentration.

A fuel mixture supply flow path 135 is disposed between the mixer 130 and the combustor 113 to connect the mixer 130 and the combustor 113. The fourth sensor unit 190 may be installed on the fuel mixture supply flow path 135 and measure the mixing ratio, the temperature, and the pressure of the fuel mixture that flows through the fuel mixture supply flow path 135.

The fourth sensor unit 190 may include a fourth mixing ratio sensor unit 193 that measures the mixing ratio of the fuel mixture. The fourth sensor unit 190 may include a fourth temperature sensor unit 191 that measures the temperature of the fuel mixture, and a fourth pressure sensor unit 192 that measures the pressure of the fuel mixture.

The fourth mixing ratio sensor unit 193 may be configured in various forms and measure the mixing ratio of fuel and air as described above. For example, the fourth mixing ratio sensor unit 193 may measure the mixing ratio of fuel and air through gas chromatography. However, the design of the fourth mixing ratio sensor unit 193 is not limited thereto and may include any apparatus capable of measuring the mixing ratio of fuel and air.

The gas turbine system 100 may include a control unit 10 that controls the mixture air flow meter 141 in such a way that the Wobbe Index is calculated based on a mixing ratio, a temperature, and a pressure of the fuel mixture measured by the fourth sensor unit 190. The calculated Wobbe Index is compared to a predetermined range of the Wobbe Index, and an amount of air injected into the mixer 130 may be adjusted.

The control unit 10 may be configured in various ways. For example, the control unit 10 may include one of a general personal computer (PC), a programmed circuit board, and a main controller of the gas turbine system 100. However, for convenience of description, a case where the control unit 10 is the main controller of the gas turbine system 100 will now be described.

When the gas turbine system 100 operates, the gas turbine 110 operates. During the operation, fuel moves to the gas turbine 110 through the fuel supply flow path 128, and air moves to the gas turbine 110 through the air supply flow path 125.

In more detail, fuel may be supplied to the fuel supply flow path 128 through a fuel compressor 145 and a regulator 147. The fuel may be injected into the first heat exchanger 151 by passing through the second sensor unit 170 installed on the fuel supply flow path 128.

The second sensor unit 170 may measure at least one of the temperature and the pressure of the fuel injected into the first heat exchanger 151. In more detail, the second temperature sensor unit 171 may measure the temperature of the fuel injected into the first heat exchanger 151, and the second temperature sensor unit 172 may measure the pressure of the fuel injected into the first heat exchanger 151.

The measured temperature and pressure may be transmitted to the control unit 10. The control unit 10 may check a state of the fuel based on the measured temperature and pressure. A material used as the fuel may have various forms such as land fill gas, bio gas, etc.

The state of the fuel may be varied according to the temperature and the pressure of the fuel. For example, the fuel may have various forms such as a state in which liquid and gas are mixed, a state in which solid and liquid are mixed, and a solid state, etc. The control unit 10 may check the state of the fuel supplied to the first heat exchanger 151 based on the measured temperature and pressure.

In a case where the state of the fuel supplied to the first heat exchanger 151 is checked as described above, the control unit 10 may control the first heat exchanger 151. That is, the control unit 10 may control the first heat exchanger 151 according to the state of the fuel injected into the first heat exchanger 151.

In more detail, the control unit 10 may control the first heat exchanger 151 when the fuel supplied to the first heat exchanger 151 is in a liquid state. For example, in a case where the state of the fuel supplied to the first heat exchanger 151 is liquid, the control unit 10 may control the first heat exchanger 151 to supply heat for converting the fuel from liquid to gas.

Fuel preheated by the first heat exchanger 151 passes through the fuel flow meter 142 and flows through the fuel supply flow path 128. In this regard, a pressure, a temperature, and a flux of the preheated fuel may be measured by passing through the first sensor unit 160.

In more detail, the first temperature sensor unit 161 may measure the temperature of the preheated fuel, and the first pressure sensor unit 162 may measure the pressure of the preheated fuel. The first flux sensor unit 163 may measure the flux of the preheated fuel.

The above-measured temperature, pressure, and flux may be transmitted to the control unit 10. The control unit 10 may compare the measured temperature with a predetermined temperature range. In more detail, the predetermined temperature range may be generated from a temperature at which the state of the fuel is changed to the gas state as described above to a temperature at which the fuel is combusted.

If the measured temperature has a value lower than a minimum value of the predetermined temperature range, the control unit 10 may control the first heat exchanger 151 to further carry out a thermal exchange. Also, if the measured temperature is within the predetermined temperature range, the control unit 10 may control the first heat exchanger 151 to maintain a state. Meanwhile, if the measured temperature has a value higher than a maximum value of the predetermined temperature range, the control unit 10 may control the first heat exchanger 151 to stop operating.

The control unit 10 may receive and store the measured pressure from the first sensor unit 160. The pressure measured by the first pressure sensor unit 162 may be used as a reference value for controlling the first compressor 120 that will be described later.

The control unit 10 may receive and store the measured flux from the first sensor unit 160. The control unit 10 may adjust the fuel flow meter 142 based on the measured flux. A method in which the control unit 10 controls the fuel flow meter 142 will be described in detail later.

Air may be supplied to the first compressor 120 from an external source during the above process. The supplied air may be compressed by the first compressor 120 and move to the mixture air flow meter 141. A flux of the air may be controlled by the mixture air flow meter 141.

The third sensor unit 180 may measure at least one of a temperature, a pressure, and a flux of the air that passes through the mixture air flow meter 141 and moves to the air supply flow path 125. In more detail, the third temperature sensor unit 181 may measure the temperature of the air, the third pressure sensor unit 812 may measure the pressure of the air, the third flux sensor unit 183 may measure the flux of the air, and the measured temperature, pressure, and flux may be transmitted to the control unit 10. The control unit 10 may measure and store the temperature, the pressure, and the flux from the third sensor unit 180.

The fuel and air that pass through the fuel supply flow path 128 and the air supply flow path 125, respectively, may be mixed by the mixer 130. In this regard, the mixer 130 may mix the fuel and air to generate a fuel mixture.

The above-generated fuel mixture may be supplied to the combustor 113 from the mixer 130 through the fuel mixture supply flow path 135. The fourth sensor unit 190 may measure a mixing ratio, a temperature, and a pressure of the fuel mixture that moves through the fuel mixture supply flow path 135. The measured mixing ratio, temperature, and pressure of the fuel mixture may be transmitted to and stored in the control unit 10.

In more detail, the fourth mixing ratio sensor unit 193 may measure the mixing ratio of the fuel mixture, the fourth temperature sensor unit 191 may measure the temperature of the fuel mixture, and the fourth pressure sensor unit 192 may measure the pressure of the fuel mixture, and the measured mixing ratio, temperature, and pressure of the fuel mixture may be transmitted to the control unit 10.

The control unit 10 may calculate the Wobbe Index based on the measured mixing ratio, temperature, and pressure. The control unit 10 may compare the calculated Wobbe Index with the predetermined Wobbe Index range. The control unit 10 may control the gas turbine system 100 based on the measured temperature, pressure, flux, and mixing ratio. A method in which the control unit 10 controls the gas turbine system 100 based on the temperature, the pressure, the flux, and the mixing ratio will now be described in detail.

1. In a Case where the Calculated Wobbe Index is Smaller than the Minimum Value of the Predetermined Wobbe Index Range The control unit 10 may control the first heat exchanger 151 through the first temperature sensor unit 161, the second temperature sensor unit 171, and the fourth temperature sensor unit 191 as described above.

Firstly, when the control unit 10 controls the first heat exchanger 151 as described above, the control unit 10 may compare the calculated Wobbe Index based on a mixing ratio, a temperature, and a pressure measured by the fourth sensor unit 190 with the predetermined Wobbe Index range.

If the calculated Wobbe Index is determined to be out of the predetermined Wobbe Index range, the control unit 10 may control the first heat exchanger 151. In more detail, if the calculated Wobbe Index is determined to be smaller than the minimum Wobbe Index of the predetermined range, the control unit 10 may control the first heat exchanger 151 in such a way that the temperature of the fuel ejected from the first heat exchanger 151 decreases.

The control unit 10 may also control the second heat exchanger 153 in such a way that the temperature of the air ejected from the second heat exchanger 153 decreases. In more detail, the temperature of the fuel mixture ejected from the mixer 130 may be varied according to the temperatures of the fuel and air that are injected into the mixer 130. In particular, the temperature of the fuel mixture ejected from the mixer 130 may decrease in a case where the temperatures of the fuel and the air that are injected into the mixer 130 decrease. Thus, the control unit 10 may control the temperature of the fuel mixture ejected from the mixer 130 by controlling at least one of the first heat exchanger 151 and the second heat exchanger 153.

The control unit 10 may vary the calculated Wobbe Index by controlling the pressure of at least one of the fuel and air that are injected into the mixer 130.

In more detail, the control unit 10 may control the pressure of the fuel injected into the mixer 130 to decrease. The control unit 10 may decrease the pressure of the fuel by controlling the fuel compressor 145 disposed on the fuel supply flow path 128. Alternately, the control unit 10 may not control the fuel compressor 145 but instead adjust an operation of the first compressor 120 to lower the pressure of the air.

In this case, since the pressure of the fuel mixture is closely related to the pressures of the both fuel and air, the pressure of the fuel mixture may decrease.

The decrease in the temperature and pressure described above may occur in special conditions. In general, since the temperatures and the pressures of the fuel and air are closely related to stability and operability of the first compressor 120, the fuel compressor 145, the first heat exchanger 151, the second heat exchanger 153, and the gas turbine system 100, the control unit 10 may control the Wobbe Index based on the mixing ratio of the fuel mixture rather than the temperature or the pressure.

In more detail, the control unit 10 may calculate the Wobbe Index based on the temperature, pressure, and mixing ratio of the fuel mixture. In this regard, the temperature and pressure of the fuel mixture may be determined as described above. The control unit 10 may control the first compressor 120, the fuel compressor 145, the first heat exchanger 151, and the second heat exchanger 153 according to temperature and pressure determined at an initial operating stage of the gas turbine system 100.

The fourth mixing ratio sensor unit 193 may measure a ratio of the fuel and air of the fuel mixture and transmit the ratio to the control unit 10. The control unit may calculate the Wobbe Index based on the mixing ratio, temperature, and pressure of the fuel mixture as described above.

The control unit may compare the calculated Wobbe Index with the predetermined Wobbe Index range. If the calculated Wobbe Index is smaller than the minimum value of the predetermined Wobbe Index range, the control unit may control the fuel mixture to include more fuel.

In more detail, since the Wobbe Index is proportional to a lower heating value as described above, more fuel may be controlled to be added to increase the Wobbe Index.

The control unit may control the fuel flow meter 142 to further open so as to supply increased amount of fuel to the mixer 130. The control unit may also control air to be blocked so as to increase a proportion of fuel that occupies in the fuel mixture. In more detail, the control unit may reduce an amount of air supplied to the air supply flow path 125 by controlling the mixture air flow meter 141 to reduce its opening.

In particular, if the portion of the fuel that occupies in the fuel mixture is determined as described above, the control unit may receive a feedback of the proportion of the fuel and receive the fluxes of the fuel and air measured by the first flux sensor unit 163 and the third flux sensor unit 183, respectively, to compare the fluxes of the fuel and air.

The control unit may calculate a necessary flux of fuel or a flux of air that needs to be reduced from the feedback of the proportion of the fuel. The control unit may control the fuel flow meter 142 and the mixture air flow meter 141 based on the calculated necessary flux of fuel or flux of air that needs to be reduced.

The control unit may preferentially control the flux of air during the above-described control. In more detail, in a case where the control unit controls the flux of fuel, since combustion is impossible with a small proportion of air or a small amount of fuel, the control unit may receive a supply of fuel necessary for the gas turbine system 100 and control the proportion of fuel through the flux of air.

2. In a Case where the Calculated Wobbe Index is within the Predetermined Wobbe Index Range In the case where the calculated Wobbe Index is within the predetermined Wobbe Index range, the control unit may control the gas turbine system 100 to maintain a current status. In particular, the control unit may continuously receive a feedback of a temperature, a pressure, a flux, and a mixing ratio of each material to control the gas turbine system 100 to normally operate.

3. In a Case where the Calculated Wobbe Index Exceeds the Maximum Value of the Predetermined Wobbe Index Range In the case where the calculated Wobbe Index exceeds the maximum Wobbe Index of the predetermined Wobbe Index range, the control of the control unit may be different from the control described with respect to the case 1 where the calculated Wobbe Index is smaller than the minimum value of the predetermined Wobbe Index range.

In more detail, the control unit may receive a feedback of the temperature, pressure, and mixing ratio of the fuel mixture and calculate the Wobbe Index. The control unit may compare the calculated Wobbe Index with the predetermined Wobbe Index range.

If the control unit compares the calculated Wobbe Index with the predetermined Wobbe Index range and determines that the calculated Wobbe Index is greater than the maximum Wobbe Index of the predetermined Wobbe Index range, the control unit 10 may control may control the temperature or pressure of the fuel mixture to increase. Also, the control unit 10 may control an amount of fuel in the mixing ratio of the fuel mixture to decrease.

In more detail, in a case where the control unit 10 controls the temperature of the fuel mixture to increase, the control unit 10 may control at least one of the first heat exchanger 151 and the second heat exchanger 153 so that the temperature of at least one of fuel and air increases.

In a case where the control unit 10 controls the pressure of the fuel mixture to increase, the control unit 10 may control at least one of the fuel compressor 145 and the first compressor 120 so that the pressure of at least one of fuel and air increases.

The control unit may preferentially control an amount of fuel so as to obtain the stability and operability of the gas turbine system 100 as described above. In particular, as described above, the control unit 10 may control a proportion of fuel by controlling an amount of the fuel.

In more detail, the control unit 10 may control the amount of air by adjusting an opening degree of the mixture air flow meter 141. For example, the control unit 10 may control the amount of air injected into the mixer 130 to increase by controlling the mixture air flow meter 141 to open to a larger degree.

If the amount of air increases, an amount of fuel per unit volume decreases, and the lower heating value (LHV) decreases. Thus, the calculated Wobbe Index is reduced to be identical to the predetermined Wobbe Index range.

Meanwhile, in a case where the calculated Wobbe Index is identical to the predetermined Wobbe Index range during the above-described control, the control unit 10 may control the gas turbine system 100 to maintain a current status.

Therefore, the gas turbine system 100 mixes air and fuel, generates a fuel mixture, and supplies the fuel mixture to the gas turbine 110, thereby regularly and elaborately adjusting the Wobbe Index. The gas turbine system 100 adjusts the Wobbe Index of the fuel mixture, thereby reducing a contamination material generated during combustion of the gas turbine 110.

Figure 2:
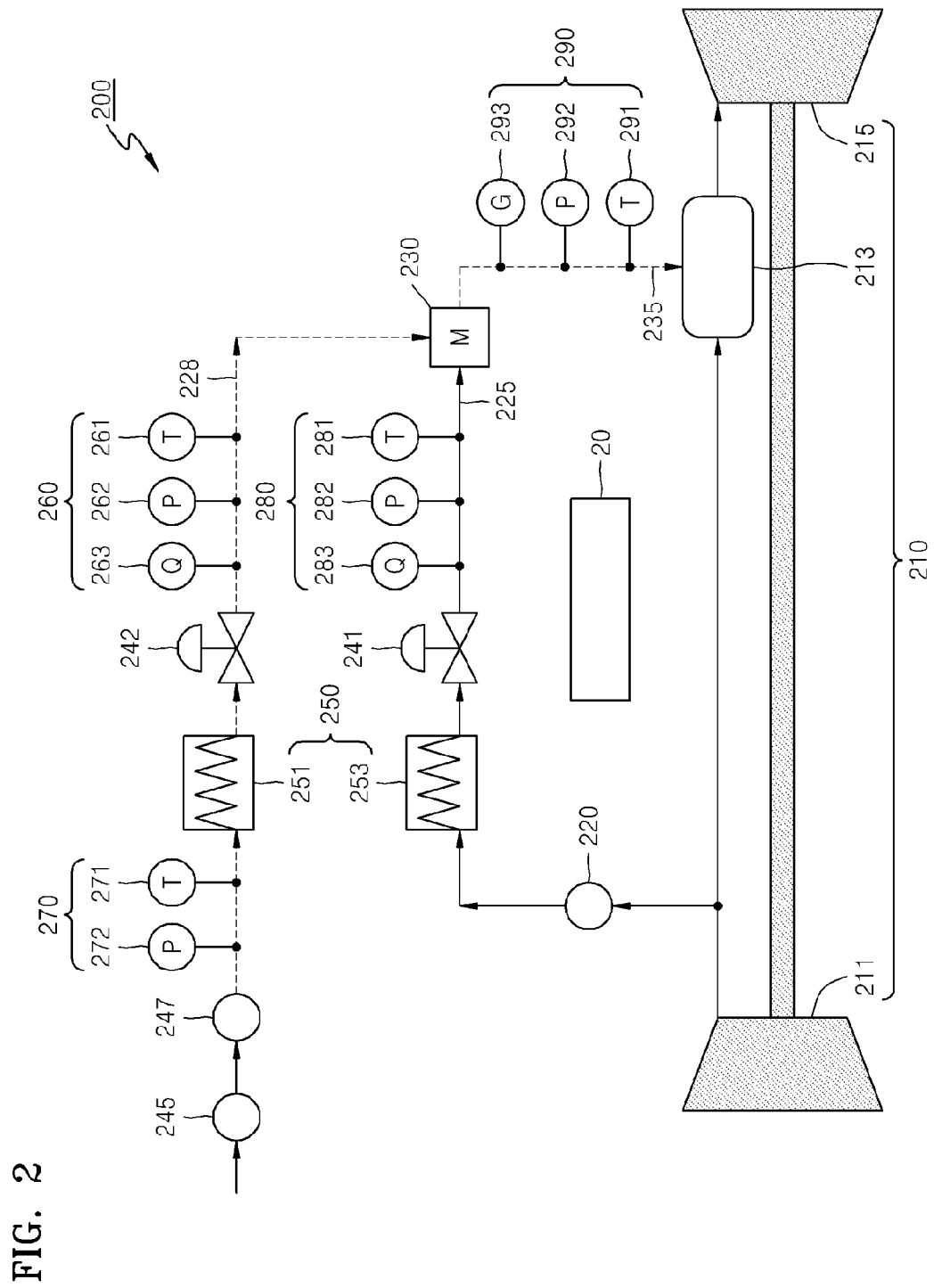
FIG. 2 is a conceptual diagram of a gas turbine system according to another exemplary embodiment.

FIG. 2 is a conceptual diagram of a gas turbine system 200 according to another exemplary embodiment.

Referring to FIG. 2, the gas turbine system 200 may include a first compressor 220, a gas turbine 210, a heat exchanger 250, a first sensor unit 260, a second sensor unit 270, a third sensor unit 280, a fourth sensor unit 290, and a mixer 230.

The gas turbine 210 includes a second compressor 211, a combustor 213, and a turbine 215. The heat exchanger 250 may include a first heat exchanger 251 and a second heat exchanger 253. The first sensor unit 260 may include a first temperature sensor unit 261, a first pressure sensor unit 262, and a first flux sensor unit 263. The second sensor unit 270 may include a second temperature sensor unit 271 and a second pressure sensor unit 272.

The third sensor unit 280 may include a third sensor unit 281, a third pressure sensor unit 282, and a third flux sensor unit 283. The fourth sensor unit 290 may include a fourth temperature sensor unit 291, a fourth pressure sensor unit 292, and a fourth mixing ratio sensor unit 293.

The first compressor 220, the gas turbine 210, the heat exchanger 250, the first sensor unit 260, the second sensor unit 270, the third sensor unit 280, the fourth sensor unit 290, and the mixer 230 are similar to the first compressor 120, the gas turbine 110, the heat exchanger 150, the first sensor unit 160, the second sensor unit 170, the third sensor unit 180, the fourth sensor unit 190, and the mixer 130 described with reference to FIG. 1, and thus detailed descriptions thereof are omitted. Similar to FIG. 1, fuel may be supplied to the fuel supply flow path 228 through a fuel compressor 245 and a regulator 247.

However, unlike the description provided with reference to FIG. 1, the first compressor 220 may not receive air from an external source but may receive a supply of air from the second compressor 211 of the gas turbine system 200. In more detail, the air flow path 225 may connect the first compressor 220 and the second compressor 211 and move a part of air compressed by the second compressor 211 to the first compressor 220.

The first compressor 220 may receive air supplied by the second compressor 211 and recompress the air from the second compressor 211. Thus, power consumed by the first compressor 220 may be reduced, thereby reducing power necessary for the gas turbine system 200.

An operation of the gas turbine system 200 may be performed in a similar way to that described above with reference to FIG. 1.

1. In a Case where the Calculated Wobbe Index is Smaller than the Minimum Value of the Predetermined Wobbe Index Range A control unit 20 may calculate the Wobbe Index based on a temperature, a pressure, and a mixing ratio of a fuel mixture that moves in a fuel mixture supply flow path 235 measured by the fourth temperature sensor unit 291, the fourth pressure sensor unit 292, and the fourth mixing ratio sensor unit 293, respectively.

The control unit 20 may compare the calculated Wobbe Index with the predetermined Wobbe Index range. In more detail, if the calculated Wobbe Index is smaller than the minimum value of the predetermined Wobbe Index range, the control unit 20 may control the temperature and pressure of the fuel mixture to decrease or may control a proportion of fuel of the mixing ratio of the fuel mixture to increase.

In more detail, in a case where the temperature of the fuel mixture decreases, the control unit 20 may control at least one of the first heat exchanger 251 and the second heat exchanger 253 as described above with reference to FIG. 1.

In a case where the pressure of the fuel mixture decreases, the control unit 20 may control at least one of the fuel compressor 245 and the first compressor 220 as described above with reference to FIG. 1.

The control unit 20 may control the second compressor 211 to decrease pressure of air. However, in this case, since there may be a problem in the efficiency of the gas turbine 210, the control unit 20 may control an operation of the second compressor 211 while maintaining the efficiency of the gas turbine 210.

In a case where the proportion of the fuel increases, the control unit 20 may control at least one of a fuel flow meter 242 and a mixture air flow meter 241 as described above with reference to FIG. 1.

The controlled fuel and air may be moved to the mixer 230 through the air flow path 225 and a fuel supply flow path 228. The fuel mixture generated by the mixer 230 may be moved to the combustor 213 through the fuel mixture supply flow path 235.

2. In a Case where the Calculated Wobbe Index is within the Predetermined Wobbe Index Range The control unit 20 may compare the calculated Wobbe Index with the predetermined Wobbe Index range. In the case where the calculated Wobbe Index is within the predetermined Wobbe Index range, the control unit 20 may control the gas turbine system 200 to maintain a current status as described above with reference to FIG. 1.

3. In a Case where the Calculated Wobbe Index Exceeds the Maximum Value of the Predetermined Wobbe Index Range The control unit 20 may compare the calculated Wobbe Index with the maximum value of the predetermined Wobbe Index range. The control unit 20 may control the gas turbine system 200 in a similar way to that described above with reference to FIG. 1.

In more detail, the control unit 10 may control the temperature and pressure of the fuel mixture to increase or may control the proportion of the fuel to decrease.

For example, as described above with reference to FIG. 1, the control unit 20 may control at least one of the first heat exchanger 251 and the second heat exchanger 253 to increase at least one of the temperature and pressure of the fuel mixture. Also, as described above with reference to FIG. 1, the control unit 20 may control at least one of the fuel flow meter 242 and the mixture air flow meter 241 to decrease the proportion of the fuel of the fuel mixture.

Therefore, the gas turbine system 200 mixes air and fuel, generates a fuel mixture, and supplies the fuel mixture to the gas turbine 210, thereby regularly and elaborately adjusting the Wobbe Index. The gas turbine system 200 adjusts the Wobbe Index of the fuel mixture, thereby reducing a contamination material generated during combustion of the gas turbine 210.

Figure 3:
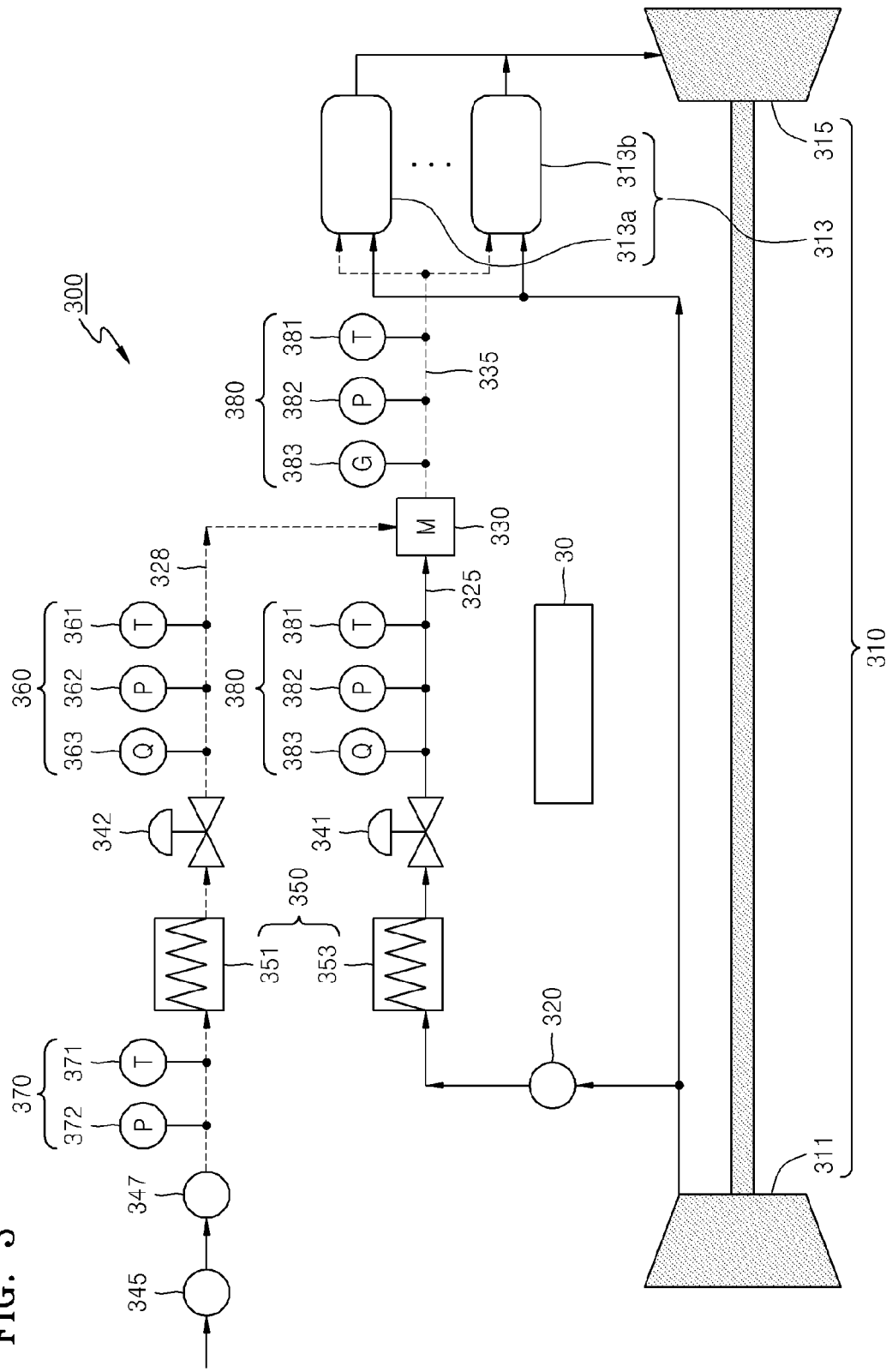
FIG. 3 is a conceptual diagram of a gas turbine system according to another exemplary embodiment.

FIG. 3 is a conceptual diagram of a gas turbine system 300 according to another exemplary embodiment.

Referring to FIG. 3, the gas turbine system 300 may include a first compressor 320, a gas turbine 310, a heat exchanger 350, a first sensor unit 360, a second sensor unit 370, a third sensor unit 380, a fourth sensor unit 390, and a mixer 330.

The gas turbine 310 includes a second compressor 311, a combustor 313, and a turbine 315. The heat exchanger 350 may include a first heat exchanger 351 and a second heat exchanger 353. The first sensor unit 360 may include a first temperature sensor unit 361, a first pressure sensor unit 362, and a first flux sensor unit 363. The second sensor unit 370 may include a second temperature sensor unit 371 and a second pressure sensor unit 372.

The third sensor unit 380 may include a third sensor unit 381, a third pressure sensor unit 382, and a third flux sensor unit 383. The fourth sensor unit 390 may include a fourth temperature sensor unit 391, a fourth pressure sensor unit 392, and a fourth mixing ratio sensor unit 393.

The first compressor 320, the gas turbine 310, the heat exchanger 350, the first sensor unit 360, the second sensor unit 370, the third sensor unit 380, the fourth sensor unit 390, and the mixer 330 are similar to the first compressor 120, the gas turbine 110, the heat exchanger 150, the first sensor unit 160, the second sensor unit 170, the third sensor unit 180, the fourth sensor unit 190, and the mixer 130 described with reference to FIG. 1, and thus detailed descriptions thereof are omitted. Similar to FIG. 1, fuel may be supplied to the fuel supply flow path 328 through a fuel compressor 345 and a regulator 347.

However, unlike the description provided with reference to FIG. 1, the first compressor 320 may not receive air from an external source but may receive a supply of air from the second compressor 311 of the gas turbine system 300. In more detail, the air flow path 325 may connect the first compressor 320 and the second compressor 311 and move a part of air compressed by the second compressor 311 to the first compressor 320.

The first compressor 320 may receive air supplied by the second compressor 311 and recompress the air. Thus, power consumed by the first compressor 320 may be reduced, thereby reducing power necessary for the gas turbine system 300.

The gas turbine 310 may include a plurality of combustors 313. In more detail, the combustor 313 may include a first combustor 313a that receives a supply of a fuel mixture from the mixer 330. The combustor 313 may include a second combustor 313b configured in the same way as the first combustor 313a. A fuel mixture supply flow path 335 branches off to a plurality of paths to connect the mixer 330 and the first combustor 313a and the mixer 330 and the second combustor 313b.

Also, unlike the gas turbine 110 of FIG. 1, a part of compressed air from the second compressor 311 of the gas turbine 310 is supplied to each of the first combustor 313a and the second combustor 313b.

An operation of the gas turbine system 300 may be performed in a similar way to that described above.

1. In a Case where the Calculated Wobbe Index is Smaller than the Minimum Value of the Predetermined Wobbe Index Range A control unit 30 may calculate the Wobbe Index based on a temperature, a pressure, and a mixing ratio of a fuel mixture that moves in the fuel mixture supply path flow 335 measured by the fourth temperature sensor unit 391, the fourth pressure sensor unit 392, and the fourth mixing ratio sensor unit 393, respectively.

The control unit 30 may compare the calculated Wobbe Index with the predetermined Wobbe Index range. If the calculated Wobbe Index is smaller than the minimum value of the predetermined Wobbe Index range, the control unit 30 may control the temperature and pressure of the fuel mixture to decrease or may control a proportion of fuel of the mixing ratio of the fuel mixture to increase.

In more detail, in a case where the temperature of the fuel mixture decreases, the control unit 30 may control at least one of the first heat exchanger 351 and the second heat exchanger 353 as described above.

In a case where the pressure of the fuel mixture decreases, the control unit 30 may control at least one of the fuel compressor 345 and the first compressor 320 as described above.

The control unit 30 may control the second compressor 311 to decrease a pressure of air. However, in this case, since there may be a problem in the efficiency of the gas turbine 310, the control unit 30 may control an operation of the second compressor 311 while maintaining the efficiency of the gas turbine 310.

Meanwhile, in a case where the proportion of the fuel increases, the control unit 30 may control at least one of a fuel flow meter 342 and a mixture air flow meter 341 as described above.

The controlled fuel and air may be moved to the mixer 330 through the air flow path 325 and a fuel supply flow path 328. The fuel mixture generated by the mixer 330 may be moved to the combustor 313 through the fuel mixture supply path flow 335.

2. In a Case where the Calculated Wobbe Index is within the Predetermined Wobbe Index Range The control unit 30 may compare the calculated Wobbe Index with the predetermined Wobbe Index range. In this regard, in the case where the calculated Wobbe Index is within the predetermined Wobbe Index range, the control unit 30 may control the gas turbine system 300 to maintain a current status as described above.

3. In a Case where the Calculated Wobbe Index Exceeds the Maximum Value of the Predetermined Wobbe Index Range The control unit 30 may compare the calculated Wobbe Index with the maximum value of the predetermined Wobbe Index range. The control unit 30 may control the gas turbine system 300 in a similar way to that described above.

In more detail, the control unit 30 may control the temperature and pressure of the fuel mixture to increase or may control the proportion of the fuel to decrease.

For example, as described above, the control unit 30 may control at least one of the first heat exchanger 351 and the second heat exchanger 353 to increase at least one of the temperature and pressure of the fuel mixture. Also, as described above, the control unit 30 may control at least one of the fuel flow meter 342 and the mixture air flow meter 341 to decrease the proportion of the fuel of the fuel mixture.

Therefore, the gas turbine system 300 mixes air and fuel, generates a fuel mixture, and supplies the fuel mixture to the gas turbine 310, thereby regularly and elaborately adjusting the Wobbe Index. The gas turbine system 300 adjusts the Wobbe Index of the fuel mixture, thereby reducing a contamination material generated during combustion of the gas turbine 310.

Figure 4:
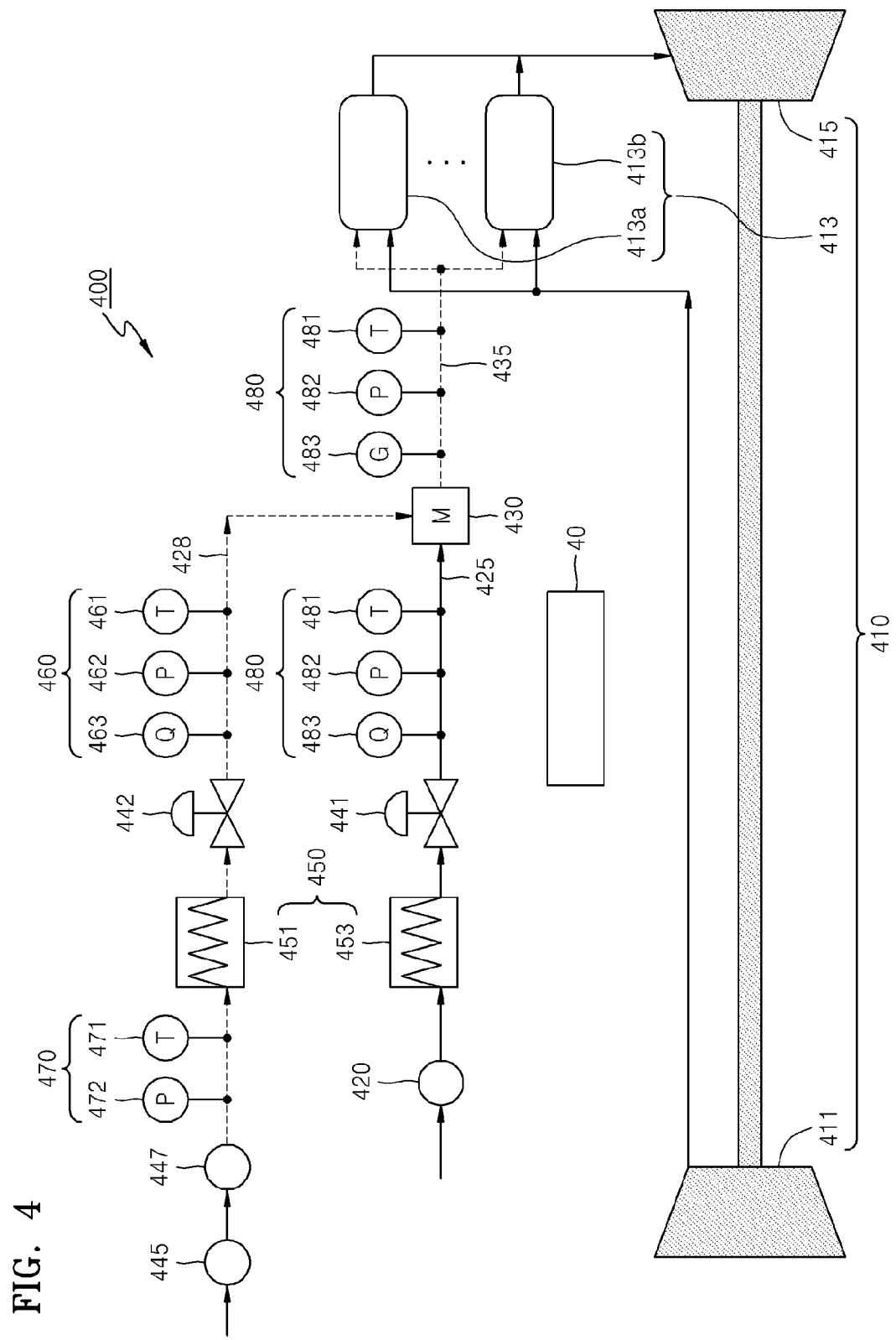
FIG. 4 is a conceptual diagram of a gas turbine system according to another exemplary embodiment.

FIG. 4 is a conceptual diagram of a gas turbine system 400 according to another exemplary embodiment.

Referring to FIG. 4, the gas turbine system 400 may include a first compressor 420, a gas turbine 410, a heat exchanger 450, a first sensor unit 460, a second sensor unit 470, a third sensor unit 480, a fourth sensor unit 490, and a mixer 430.

The gas turbine 410 includes a second compressor 411, a combustor 413, and a turbine 415. The heat exchanger 450 may include a first heat exchanger 451 and a second heat exchanger 453. The first sensor unit 460 may include a first temperature sensor unit 461, a first pressure sensor unit 462, and a first flux sensor unit 463. The second sensor unit 470 may include a second temperature sensor unit 471 and a second pressure sensor unit 472.

The third sensor unit 480 may include a third sensor unit 481, a third pressure sensor unit 482, and a third flux sensor unit 483. The fourth sensor unit 490 may include a fourth temperature sensor unit 491, a fourth pressure sensor unit 492, and a fourth mixing ratio sensor unit 493.

In this regard, the first compressor 420, the gas turbine 410, the heat exchanger 450, the first sensor unit 460, the second sensor unit 470, the third sensor unit 480, the fourth sensor unit 490, and the mixer 430 are similar to the first compressor 120, the gas turbine 110, the heat exchanger 150, the first sensor unit 160, the second sensor unit 170, the third sensor unit 180, the fourth sensor unit 190, and the mixer 130 described with reference to FIG. 1, and thus detailed descriptions thereof are omitted.

However, the gas turbine 410 may include a plurality of combustors 413. In more detail, the combustor 413 may include a first combustor 413a that receives a supply of a fuel mixture from the mixer 430. The combustor 413 may include a second combustor 413b configured in the same way as the first combustor 413a. In this regard, a fuel mixture supply flow path 435 branches off to a plurality of paths to connect the mixer 430 and the first combustor 413a and the mixer 430 and the second combustor 413b.

Also, unlike the gas turbine 110 of FIG. 1, a part of compressed air from the second compressor 411 of the gas turbine 410 is supplied to each of the first combustor 413a and the second combustor 413b.

An operation of the gas turbine system 400 may be performed in a similar way to that described above.

1. In a Case where the Calculated Wobbe Index is Smaller than the Minimum Value of the Predetermined Wobbe Index Range A control unit 40 may calculate the Wobbe Index based on a temperature, a pressure, and a mixing ratio of a fuel mixture that moves on the fuel mixture supply path flow 435 measured by the fourth temperature sensor unit 491, the fourth pressure sensor unit 492, and the fourth mixing ratio sensor unit 493, respectively.

The control unit 40 may compare the calculated Wobbe Index with the predetermined Wobbe Index range. If the calculated Wobbe Index is smaller than the minimum value of the predetermined Wobbe Index range, the control unit 40 may control the temperature and pressure of the fuel mixture to decrease or may control a proportion of fuel of the mixing ratio of the fuel mixture to increase.

In more detail, in a case where the temperature of the fuel mixture decreases, the control unit 40 may control at least one of the first heat exchanger 451 and the second heat exchanger 453 as described above.

In a case where the pressure of the fuel mixture decreases, the control unit 40 may control at least one of the fuel compressor 445 and the first compressor 420 as described above.

In a case where the proportion of the fuel increases, the control unit 40 may control at least one of a fuel flow meter 442 and a mixture air flow meter 441 as described above.

The controlled fuel and air may be moved to the mixer 430 through an air flow path 425 and a fuel supply flow path 428. The fuel mixture generated by the mixer 430 may be moved to the combustor 413 through the fuel mixture supply path flow 435.

2. In a Case where the Calculated Wobbe Index is within the Predetermined Wobbe Index Range The control unit 40 may compare the calculated Wobbe Index with the predetermined Wobbe Index range. In this regard, in the case where the calculated Wobbe Index is within the predetermined Wobbe Index range, the control unit 40 may control the gas turbine system 400 to maintain a current status as described above.

3. In a Case where the Calculated Wobbe Index Exceeds the Maximum Value of the Predetermined Wobbe Index Range The control unit 40 may compare the calculated Wobbe Index with the maximum value of the predetermined Wobbe Index range. The control unit 40 may control the gas turbine system 400 in a similar way to that described above.

In more detail, the control unit 40 may control the temperature and pressure of the fuel mixture to increase or may control the proportion of the fuel to decrease.

For example, as described above, the control unit 40 may control at least one of the first heat exchanger 451 and the second heat exchanger 453 to increase at least one of the temperature and pressure of the fuel mixture. Also, as described above, the control unit 40 may control at least one of the fuel flow meter 442 and the mixture air flow meter 441 to decrease the proportion of the fuel of the fuel mixture.

Therefore, the gas turbine system 400 mixes air and fuel, generates a fuel mixture, and supplies the fuel mixture to the gas turbine 410, thereby regularly and elaborately adjusting the Wobbe Index. The gas turbine system 400 adjusts the Wobbe Index of the fuel mixture, thereby reducing a contamination material generated during combustion of the gas turbine 410.

Figure 5:
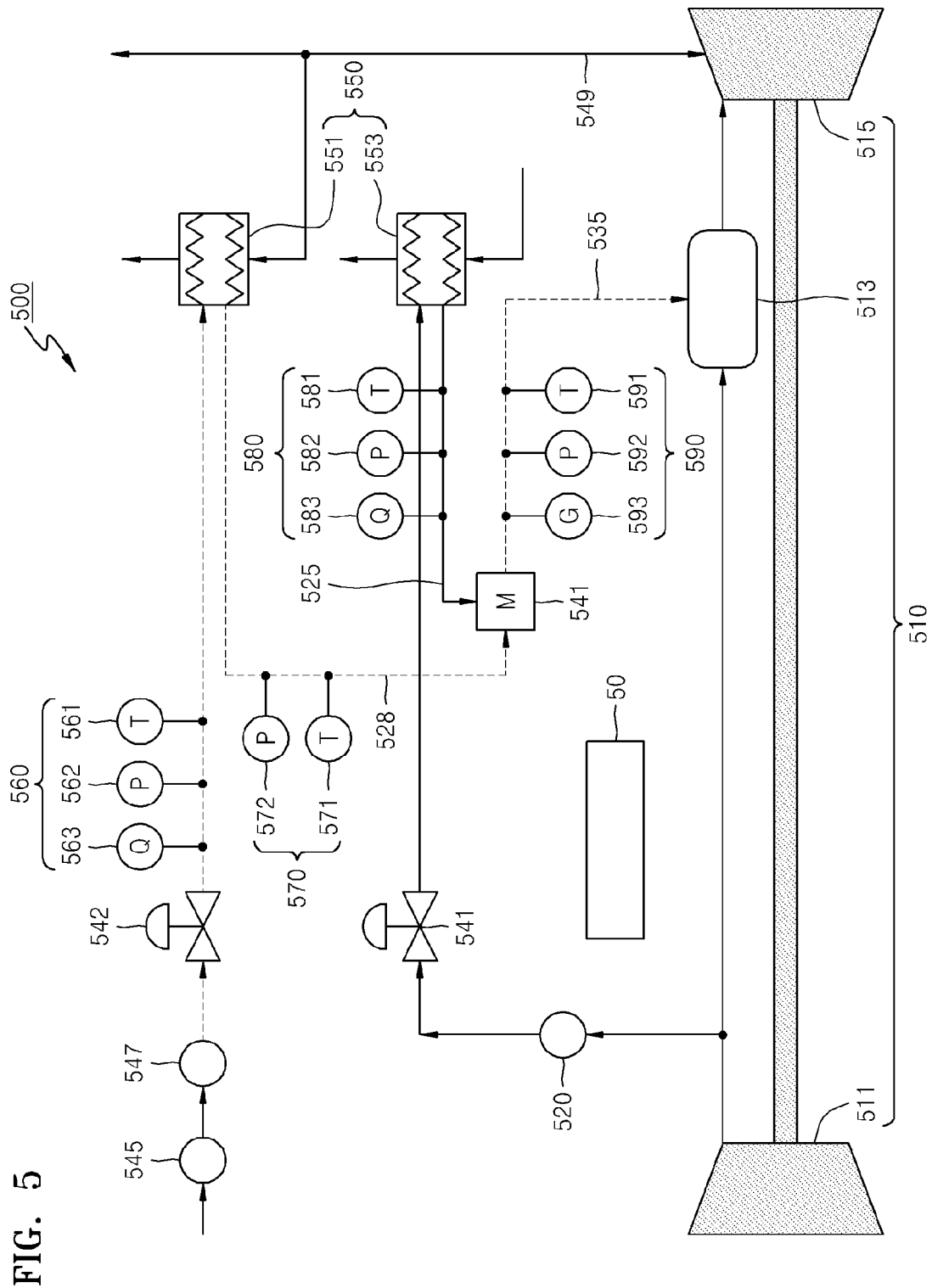
FIG. 5 is a conceptual diagram of a gas turbine system according to another exemplary embodiment.

FIG. 5 is a conceptual diagram of a gas turbine system 500 according to another exemplary embodiment.

Referring to FIG. 5, the gas turbine system 500 may include a first compressor 520, a gas turbine 510, a heat exchanger 550, a first sensor unit 560, a second sensor unit 570, a third sensor unit 580, a fourth sensor unit 590, and a mixer 530.

The gas turbine 510 includes a second compressor 511, a combustor 513, and a turbine 515. The heat exchanger 550 may include a first heat exchanger 551 and a second heat exchanger 553. The first sensor unit 560 may include a first temperature sensor unit 561, a first pressure sensor unit 562, and a first flux sensor unit 563. The second sensor unit 570 may include a second temperature sensor unit 571 and a second pressure sensor unit 572.

The third sensor unit 580 may include a third sensor unit 581, a third pressure sensor unit 582, and a third flux sensor unit 583. The fourth sensor unit 590 may include a fourth temperature sensor unit 591, a fourth pressure sensor unit 592, and a fourth mixing ratio sensor unit 593.

The first compressor 520, the gas turbine 510, the heat exchanger 550, the first sensor unit 560, the second sensor unit 570, the third sensor unit 580, the fourth sensor unit 590, and the mixer 530 are similar to the first compressor 120, the gas turbine 110, the heat exchanger 150, the first sensor unit 160, the second sensor unit 170, the third sensor unit 180, the fourth sensor unit 190, and the mixer 130 described with reference to FIG. 1, and thus detailed descriptions thereof are omitted. Similar to FIG. 1, fuel may be supplied to the fuel supply flow path 528 through a fuel compressor 345 and a regulator 347.

However, unlike the description provided with reference to FIG. 1, the first compressor 520 may not receive air from an external source but may receive a supply of air from the second compressor 511 of the gas turbine system 500. In more detail, the air flow path 525 may connect the first compressor 520 and the second compressor 511 and move a part of air compressed by the second compressor 511 to the first compressor 520.

The first compressor 520 may receive air supplied by the second compressor 511 and recompress the air. Thus, power consumed by the first compressor 520 may be reduced, thereby reducing power necessary for the gas turbine system 500.

The first heat exchanger 551 and a fuel flow meter 542 may be disposed on the fuel supply flow path 528 in such a way the locations of the first heat exchanger 551 and the fuel flow meter 542 are switched. In more detail, the first heat exchanger 551 may be disposed at a downstream side of the fuel flow meter 542 on the fuel supply flow path 528. Thus, fuel flowing through the fuel supply flow path 528 may sequentially pass through the fuel flow meter 542 and then the first heat exchanger 551.

The second heat exchanger 553 and a mixture air flow meter 541 may be disposed on the air supply flow path 525 in such a way the locations of the second heat exchanger 553 and the mixture air flow meter 541 are switched. In more detail, the second heat exchanger 553 may be disposed at a downstream side of the mixture air flow meter 541 on the air supply flow path 525. Thus, fuel flowing through the air supply flow path 525 may sequentially pass through the mixture air flow meter 541 and then the second heat exchanger 553.

At least one of the first heat exchanger 551 and the second heat exchanger 553 may perform a heat exchange operation by using an exhaust gas discharged from the turbine 515 as a thermal source. In more detail, the first heat exchanger 551 may be connected to an exhaust gas flow path 549 connected to the turbine 515. The second heat exchanger 553 may be connected to an external thermal source (not shown). The first heat exchanger 551 may adjust a temperature of fuel through a heat exchange with the exhaust gas of the turbine 515. The second heat exchanger 553 may adjust a temperature of air through a heat exchange with the external thermal source.

The second sensor unit 570 may be disposed at a downstream side of the first heat exchanger 551. In more detail, the second sensor unit 570 may be disposed on the fuel supply flow path 528 to measure at least one of a temperature and a pressure of fuel ejected by the first heat exchanger 551. Operations of the first sensor unit 560 and the second sensor unit 570 may be different from the first sensor unit 160 described with reference to FIG. 1. This will be described in more detail when describing a control method later.

The third sensor unit 580 may not be disposed in an ejection unit of the mixture air flow meter 541 but rather may be disposed in an ejection unit of the second heat exchanger 553. An operation and structure of the third sensor unit 580 are similar to the third sensor unit 180 described with reference to FIG. 1, and thus detailed descriptions thereof are omitted.

An operation of the gas turbine system 500 may be performed in a similar way to that described above.

1. In a Case where the Calculated Wobbe Index is Smaller than the Minimum Value of the Predetermined Wobbe Index Range A control unit 50 may calculate the Wobbe Index based on a temperature, a pressure, and a mixing ratio of a fuel mixture that moves in the fuel mixture supply flow path 535 measured by the fourth temperature sensor unit 591, the fourth pressure sensor unit 592, and the fourth mixing ratio sensor unit 593, respectively.

The control unit 50 may compare the calculated Wobbe Index with the predetermined Wobbe Index range. In more detail, if the calculated Wobbe Index is smaller than the minimum value of the predetermined Wobbe Index range, the control unit 50 may control the temperature and pressure of the fuel mixture to decrease or may control a proportion of fuel of the mixing ratio of the fuel mixture to increase.

In more detail, in a case where the temperature of the fuel mixture decreases, the control unit 50 may control at least one of the first heat exchanger 551 and the second heat exchanger 553 as described above.

The control unit 50 may store a temperature measured by the first temperature sensor unit 561 and a temperature measured by the second temperature sensor unit 571 to compare the two temperatures. In more detail, the control unit 50 may determine a state of fuel based on the temperature measured by the first temperature sensor unit 561. The control unit 50 may determine the state of fuel based on the temperature measured by the second temperature sensor unit 571 to determine whether the fuel is in a combustible form.

The control unit 50 may also determine a temperature of a fuel mixture based on the temperature measured by the second temperature sensor unit 571. In more detail, in a case where a temperature of fuel decreases, the control unit 50 may control the first heat exchanger 551 based on the temperature measured by the second temperature sensor unit 571. For example, in the case where a temperature of fuel decreases, the control unit 50 may adjust a degree of the heat exchange performed by the first heat exchanger 551 according to the temperature measured by the second temperature sensor unit 571.

In a case where a pressure of the fuel mixture decreases, the control unit 50 may control at least one of the fuel compressor 545 and the first compressor 520 as described above.

The control unit 50 may control the second compressor 511 to decrease a pressure of air. However, in this case, since there may be a problem in the efficiency of the gas turbine 510, the control unit 50 may control an operation of the second compressor 511 while maintaining the efficiency of the gas turbine 510.

In a case where a proportion of the fuel increases, the control unit 50 may control at least one of the fuel flow meter 542 and the mixture air flow meter 541 as described above.

The controlled fuel and air may be moved to the mixer 530 through the air flow path 525 and a fuel supply flow path 528. The fuel mixture generated by the mixer 430 may be moved to the combustor 513 through the fuel mixture supply path flow 535.

2. In a Case where the Calculated Wobbe Index is within the Predetermined Wobbe Index Range Meanwhile, the control unit 50 may compare the calculated Wobbe Index with the predetermined Wobbe Index range. In the case where the calculated Wobbe Index is within the predetermined Wobbe Index range, the control unit 50 may control the gas turbine system 500 to maintain a current status as described above.

3. In a Case where the Calculated Wobbe Index Exceeds the Maximum Value of the Predetermined Wobbe Index Range The control unit 50 may compare the calculated Wobbe Index with the maximum value of the predetermined Wobbe Index range. The control unit 50 may control the gas turbine system 500 in a similar way to that described above.

In more detail, the control unit 50 may control the temperature and pressure of the fuel mixture to increase or may control the proportion of the fuel to decrease.

For example, as described above, the control unit 50 may control at least one of the first heat exchanger 551 and the second heat exchanger 553 to increase at least one of the temperature and pressure of the fuel mixture. Also, as described above, the control unit 50 may control at least one of the fuel flow meter 542 and the mixture air flow meter 541 to decrease the proportion of the fuel of the fuel mixture.

Therefore, the gas turbine system 500 mixes air and fuel, generates a fuel mixture, and supplies the fuel mixture to the gas turbine 510, thereby regularly and elaborately adjusting the Wobbe Index. The gas turbine system 500 adjusts the Wobbe Index of the fuel mixture, thereby reducing a contamination material generated during combustion of the gas turbine 510.

According to one or more exemplary embodiments, a fuel mixture is generated by mixing air and fuel and is supplied to a gas turbine, thereby regularly and elaborately controlling the Wobbe Index of the fuel mixture. Further, according to one or more exemplary embodiments, the Wobbe Index of the fuel mixture, thereby reducing a contamination material generated during combustion of the gas turbine.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A gas turbine system comprising:
   a first compressor configured to compress air;
   a mixer configured to add the air from the first compressor to fuel and configured to generate a fuel mixture;
   a combustor configured to combust the fuel mixture from the mixer;
   a plurality of flow meters configured to adjust an amount of the air or the fuel injected into the mixer; and
   a controller configured to maintain Wobbe Index of the fuel mixture within a predetermined Wobbe Index range.

2. The gas turbine system of claim 1, wherein the first compressor is configured to compress the air supplied from an external source.

3. The gas turbine system of claim 1, further comprising a second compressor configured to compress the air supplied from an external source, and configured to supply the air from the second compressor to at least one of the combustor and the first compressor.

4. The gas turbine system of claim 1, wherein the plurality of flow meters comprise a fuel flow meter configured to adjust an amount of the fuel supplied to the mixer.

5. The gas turbine system of claim 4, further comprising a first sensor configured to measure at least one of a temperature, a pressure, and a flux of fuel ejected from the fuel flow meter.

6. The gas turbine system of claim 1, further comprising a heat exchanger configured to heat at least one of the air ejected from the first compressor and the fuel supplied to the mixer.

7. The gas turbine system of claim 6, further comprising a turbine configured to operate by a combustion gas ejected from the combustor,
wherein the heat exchanger configured to thermally exchange heat between the combustion gas and at least one of the air and fuel.

8. The gas turbine system of claim 6, further comprising a second sensor configured to measure at least one of a temperature and a pressure of the fuel injected into the heat exchanger and the fuel ejected from the heat exchanger.

9. The gas turbine system of claim 1, further comprising a third sensor configured to measure at least one of a temperature, a pressure, and a flux of the air ejected from a mixture air flow meter.

10. The gas turbine system of claim 1, further comprising a fourth sensor disposed between the mixer and the combustor and configured to measure a mixing ratio, a temperature, and a pressure of the fuel mixture supplied from the mixer to the combustor.

11. The gas turbine system of claim 10, wherein the controller configured to calculate the Wobbe Index based on the mixing ratio, the temperature, and the pressure of the fuel mixture measured by the fourth sensor, configured to compare the Wobbe Index with the predetermined Wobbe Index range, and configured to control the plurality of flow meters to adjust an amount of the air or fuel injected into the mixer.

12. The gas turbine system of claim 1, wherein the controller is configured to control the Wobbe Index based on a mixing ratio, a temperature, and a pressure of the fuel mixture from the mixer.

13. The gas turbine system of claim 12, wherein the controller is configured to control the temperature and the pressure of the fuel mixture to decrease or configured to control a proportion of fuel of the fuel mixture to increase if the Wobbe Index is smaller than a minimum value of the predetermined Wobbe Index range.

14. The gas turbine system of claim 12, wherein the controller is configured to control the gas turbine to maintain an operating status if the Wobbe Index is within the predetermined Wobbe Index range.

15. The gas turbine system of claim 12, wherein the controller is configured to control the temperature and the pressure of the fuel mixture to increase or configured to control a proportion of fuel of the fuel mixture to decrease if the Wobbe Index is larger than a maximum value of the predetermined Wobbe Index range.

16. The gas turbine system of claim 1 further comprising a plurality of heat exchangers configured to perform heat exchange of the air compressed by the compressor and the fuel,
wherein the controller is configured to control the Wobbe Index based on mixing ratio, temperature, and pressure of the fuel mixture from the mixer, and
wherein the controller is configured to control at least one of the plurality of flow meters and the plurality of heat exchangers to maintain the Wobbe Index within the predetermined Wobbe Index range.

17. A method of operating a gas turbine, the method comprising:
providing air from a source,
compressing the air;
adding the air that has been compressed to fuel;
generating a fuel mixture;
combusting the fuel mixture;
adjusting an amount of the air or the fuel by a plurality of flow meters; and
maintaining Wobbe Index of the fuel mixture within a predetermined Wobbe Index range.

18. The method of 17 further comprising:
calculating the Wobbe Index based on a mixing ratio, a temperature, and a pressure of the fuel mixture, and
controlling at least one of a plurality of flow meters and a plurality of heat exchangers to maintain the Wobbe Index within the predetermined Wobbe Index range.

19. The method of 17, wherein the controlling the at least one of the plurality of flow meters and the plurality of heat exchangers comprises:
controlling the temperature and the pressure of the fuel mixture to decrease or controlling a proportion of fuel of the fuel mixture to increase if the Wobbe Index is smaller than a minimum value of the predetermined Wobbe Index range;
controlling a gas turbine to maintain an operating status if the Wobbe Index is within the predetermined Wobbe Index range; and
controlling the temperature and the pressure of the fuel mixture to increase or controlling a proportion of fuel of the fuel mixture to decrease if the Wobbe Index is larger than a maximum value of the predetermined Wobbe Index range.

* * * * *